(12) United States Patent
Huang (10) Patent No.: US 9,268,506 B1
(45) Date of Patent: Feb. 23, 2016

(54) METHODS AND APPARATUS FOR DETERMINING THE STATUS OF A PERIPHERAL DEVICE USING A COUPLING DEVICE THAT INTERFACES A HOST DEVICE WITH THE PERIPHERAL DEVICE

(71) Applicant: Marvell International Ltd., Hamilton (BM)

(72) Inventor: Ying Huang, Boise, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/621,215

(22) Filed: Feb. 12, 2015

Related U.S. Application Data (60) Provisional application No. 61/943,279, filed on Feb. 21, 2014.

(51) Int. Cl.
*G06F 3/12* (2006.01)
*H04N 1/00* (2006.01)

(52) U.S. Cl.
CPC ............ *G06F 3/1205* (2013.01); *G06F 3/1236* (2013.01); *G06F 3/1253* (2013.01); *G06F 3/1292* (2013.01); *G06F 3/1294* (2013.01); *H04N 1/0097* (2013.01); *H04N 1/00204* (2013.01); *H04N 1/00973* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 8,189,225 | B1* | 5/2012 | Lo ............................ | G06F 3/122 358/1.15 |
| 2013/0070297 | A1* | 3/2013 | Kato .................. | H04N 1/00217 358/1.15 |
| 2014/0368867 | A1* | 12/2014 | Kim ...................... | G06F 3/1204 358/1.15 |
| 2015/0036191 | A1* | 2/2015 | Suzuki .................. | G06F 3/1255 358/1.15 |

* cited by examiner

*Primary Examiner* — Ngon Nguyen

(57) ABSTRACT

Embodiments of the present disclosure provide a method comprising coupling an apparatus to a peripheral device and coupling the apparatus to a computing device. The apparatus is configured to (i) receive a first job request from the computing device to be performed by the peripheral device and (ii) transmit the first job request to the peripheral device. The method further comprises instructing a user of the computing device to create a first predetermined situation at the peripheral device. The method further comprises In response to the apparatus transmitting the first job request to the peripheral device, waiting, by the apparatus, for a first status message from the peripheral device. The first status message corresponds to the first predetermined situation created by the user at the peripheral device.

20 Claims, 3 Drawing Sheets

METHODS AND APPARATUS FOR DETERMINING THE STATUS OF A PERIPHERAL DEVICE USING A COUPLING DEVICE THAT INTERFACES A HOST DEVICE WITH THE PERIPHERAL DEVICE

CROSS REFERENCE TO RELATED APPLICATIONS

This claims priority to U.S. Provisional Patent Application No. 61/943,279, filed Feb. 21, 2014, which is incorporated herein by reference.

TECHNICAL FIELD

Embodiments of the present disclosure relate to use of a coupling device that interfaces a host device to a peripheral device, and more particularly, to determine status of the peripheral device.

BACKGROUND

A peripheral device is a device that is connectable to an input/output interface of a computing device such as a computer. Examples of peripheral devices include, for example, a single-function printer, a multi-function printer including print, scan, and/or fax capabilities, a speaker, a monitor, a mouse, an external hard drive, and so on. A newer model of a device (peripheral device or computing device) typically has increased features and/or capabilities relative to an older model of the device. For example, many newer model computing devices have wireless connection capabilities while older model peripheral devices may not include or support such wireless connection capabilities. Thus, a user of a newer model computing device may be unable to wirelessly interact with an older model peripheral device without replacing the older model peripheral device with a newer model that supports wireless connection capabilities. Additionally, newer model peripheral devices may include printing codes and/or languages that are not recognizable by various computing devices. This can be due to a printing device being from an unknown manufacturer or the printing model is an unknown or unrecognizable model from a known manufacturer.

SUMMARY

In various embodiments, a method comprises coupling an apparatus to a peripheral device and coupling the apparatus to a computing device. The apparatus is configured to (i) receive a first job request from the computing device to be performed by the peripheral device and (ii) transmit the first job request to the peripheral device. The method further comprises instructing a user of the computing device to create a first predetermined situation at the peripheral device. The method further comprises, in response to the apparatus transmitting the first job request to the peripheral device, waiting, by the apparatus, for a first status message from the peripheral device. The first status message corresponds to the first predetermined situation created by the user at the peripheral device.

In various embodiments, an apparatus comprises a plurality of interfaces. A first interface of the plurality of interfaces is configured to couple the apparatus to a computing device and a second interface of the plurality of interfaces is configured to couple the apparatus to a peripheral device. The first interface is separate from the second interface and the apparatus is separate from each of (i) the computing device and (ii) the peripheral device. The apparatus further comprises memory configured to store logic. The logic is configured to instruct a user of the computing device to create a first predetermined situation at the peripheral device, and responsive to the apparatus transmitting a first job request to the peripheral device, wait for a first status message from the peripheral device, wherein the first status message corresponds to the first predetermined situation created by the user at the peripheral device. The apparatus further comprises a processor configured to execute the logic.

BRIEF DESCRIPTION OF THE DRAWINGS

In the following detailed description, reference is made to the accompanying drawings which form a part hereof wherein like numerals designate like parts throughout, and in which is shown by way of embodiments that illustrate principles of the present disclosure.

DETAILED DESCRIPTION

Figure 1:
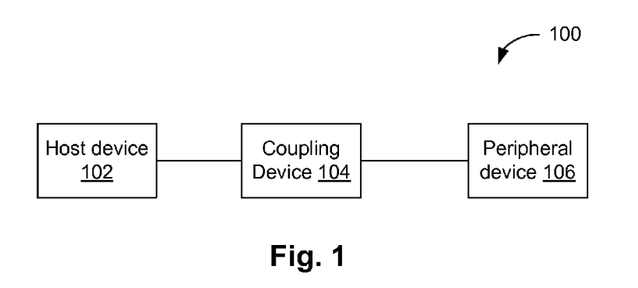
FIG. 1 schematically illustrates a host device coupled to a printing device via a coupling device.

FIG. 1 illustrates an arrangement 100 that includes a host computing device 102, a coupling device 104, and a peripheral device 106. In one embodiment, the peripheral device is a printing device. The host computing device 102 generally is a computing device that includes computing capabilities. Such computing devices include, for example, desktop computers, tower computers, laptop computers, notebook computers, tablet computers, personal digital assistants (PDAs), smart phones and other types of mobile phones. This list of possible computing devices is provided merely as an example and is not meant to be limiting.

The peripheral device 106 is a device for use with computing devices. Examples of peripheral devices include speakers, monitors, mice, external hard drives, printing devices, scanning devices, multi-function printing devices that are capable of printing, scanning, faxing, etc. For clarity and ease of understanding, the peripheral device 106 will be referred to herein as a printing device.

The coupling device 104 couples the host computing device 102 and the printing device. The coupling is at least a communicative coupling, i.e. a wireless coupling, but can also be a physical coupling. Thus, the coupling device 104 provides a communication conduit between the host computing device 102 and the printing device. In use, the host device 102 sends job requests to the coupling device 104 that are forwarded on from the coupling device 104 to the peripheral device 106.

Figure 2:
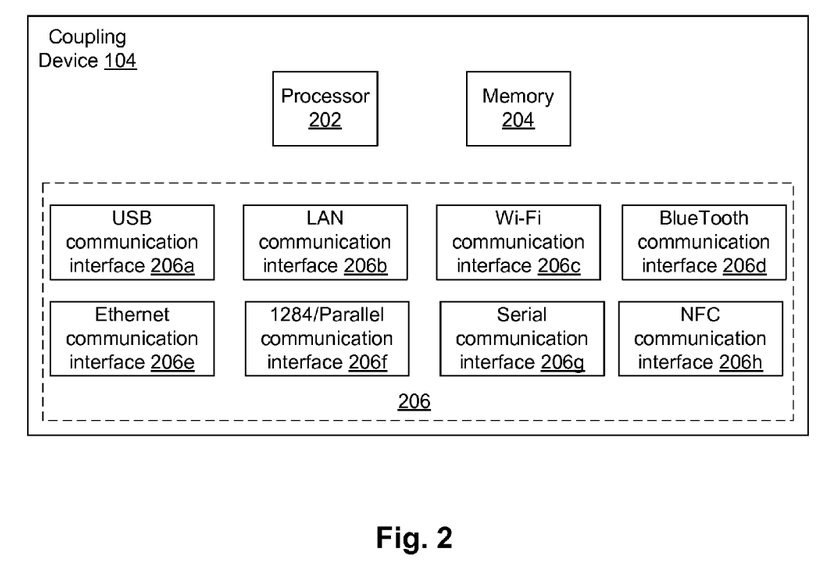
FIG. 2 schematically illustrates an example of the coupling device of FIG. 1.

FIG. 2 illustrates one embodiment of the coupling device 104. Generally, the coupling device 104 is a 'smart" module that generally includes a processor 202, a memory 204, and one or more interfaces 206. The processor 202 can be in the form of one or more processors, multi-processing cores, etc., that can be configured as a system on chip (SOC). More particularly, the processor 202 can be configured as a printer SOC. The memory 204 can include various types of memory such as, for example, random access memory (RAM), flash memory, etc. The interfaces 206 can include multiple types of communication interfaces such as, for example, a Universal Serial Bus (USB) communication interface 206a, a network (e.g., local access network (LAN)) communication interface 206b, one or more wireless communication interfaces such as a wireless LAN (Wi-Fi) communication interface 206c, a Bluetooth communication interface 206d, and/or a near field communication (NFC) communication interface 206h, an Ethernet interface 206e, a 1284/parallel interface (Institute of Electrical and Electronics Engineers (IEEE) standard 1284) 206f, and/or a serial interface 206g. Examples of interface protocols for the interfaces include USB protocol, 1284/parallel protocol, Ethernet protocol, network protocol, serial protocol, etc. NFC is a wireless technology that allows two devices to wirelessly communicate over a short distance of about 10 cm or less, and is standardized internationally within NFC Forum specifications and defined in, for example, ISO/IEC 18092, ECMA-340, and ISO 14443, and the like, and any previous or subsequent versions. The list of communication interfaces and protocols is merely an example of the possibilities and is not meant to be limiting. The memory 204 also stores logic, in the form of software and/or firmware, which can be executed by the processor 202. The coupling device 104 may also include other components not listed or illustrated such as, for example, a display, a user interface, etc.

The coupling device 104 can be coupled to the printing device via a wireless connection or a wired connection, via a wireless interface or a wired interface of the interfaces 206. Likewise, the coupling device 104 can be coupled to the host computing device 102 via a wireless connection or a wired connection, via a wireless interface or a wired interface of the interfaces 206.

For older model printing devices, there may be a very limited number of ways for a device to couple to and communicate with such older model printing devices. In general, most older model printing devices need to be physically coupled to a host computing device (or a wired computing device) via a wired connection. Thus, the coupling device 104 can be physically coupled to the printing device via a cable (not illustrated) extending from the coupling device 104 to the printing device. The cable (not illustrated) can include a USB type plug that may be plugged into a USB port of the printing device. Other types of physical connections may be utilized depending upon the type of ports included on the printing device and the interfaces 206 included with the coupling device 104. Furthermore, if the printing device includes wireless capabilities, then the coupling device 104 can be coupled to the printing device via a wireless connection, depending upon the interfaces 206 included with the coupling device 104. In various embodiments, the coupling device 104 can be physically attached and wired directly to the printing device such that the printing device and the coupling device 104 are a single, integrated unit, i.e., the coupling device 104 is part of the printing device.

Depending upon the connection capabilities of the host computing device 102, the host computing device 102 can be coupled to the coupling device 104 via various types of connections via one of the interfaces 206 of the coupling device 104. For example, depending upon the interfaces 206 included with the coupling device 104, the host computing device 102 can be coupled to the coupling device 104 via a USB connection, a Wi-Fi connection, a Bluetooth connection, a network connection, etc. Thus, the host computing device 102 can be coupled to the coupling device 104 via either a wired connection (an appropriate cable between the coupling apparatus 104 and the host computing device 102) or a wireless connection.

Accordingly, the coupling device 104 may include one or more cables (not illustrated) permanently coupled to the coupling device 104. The one or more cables are each configured with an appropriate connector, i.e. USB plugs, to be used to couple the coupling device 104 to the printing device and/or the host computing device 102. The coupling device 104 may also include one or more input/output (I/O) ports (not illustrated) to allow for detachable cables (not illustrated) configured with appropriate connectors, e.g., USB plugs, to be used to couple the coupling device 104 to the printing device and/or the host computing device 102. The coupling device 104 may also include one or more input/output (I/O) male connectors (not illustrated) such as, for example, a USB compatible plug, to be used to couple the coupling device 104 directly to the printing device via a female connector on the printing device such as, for example, a USB compatible port. The coupling device 104 may also include one or more input/output (I/O) female connectors (not illustrated) such as, for example, a USB compatible port, to be used to couple the coupling device 104 directly to the printing device via a male connector on the printing device such as, for example, a USB compatible plug. The various types of interfaces, cables and/or I/O ports and plugs allow for a variety of connection options via the coupling device 104 between the printing device and the host computing device 102.

The coupling device 104 includes logic in the form of software and/or firmware, stored in the memory 204, that may be configured to provide functionality to the printing device and, depending upon the application, the host computing device 102. For example, logic can be included in the coupling device 104 that, as previously described, provides the ability for various types of connections via interfaces 206 of the coupling device 104 between the printing device and the host computing device 102. For example, if the printing device does not have wireless capabilities, a wireless access interface can be included with the coupling device 104, as well as the appropriate software and/or firmware. The coupling device 104 can be coupled to the printing device via a physical connection and the coupling device 104 can communicate with the host computing device 102 via the wireless access interface. Thus, the host computing device 102 can wirelessly interact with the printing device. For example, the interfaces 206 of the coupling device 104 can include wireless access interfaces such as, for example, a Bluetooth interface, a Wi-Fi/Wi-Fi-direct interface, etc., along with the appropriate logic in memory 204.

Additionally, logic in the form of software and/or firmware can be included within memory 204 of the coupling device 104 to enable automatic printing via the printing device. For example, the logic can be included to cause the coupling device 104 to automatically access and retrieve documents from various locations within a network such as, for example, the Internet, the Cloud (a network-accessible computing platform), a wireless service, etc. Logic can be further included on the coupling device 104 to convert retrieved documents so that the documents can be printed by the printing device. Such automatic retrieval and printing of jobs can be scheduled directly by the logic included on the coupling device 104 to automatically retrieve content from the network, convert the content for printing, and print the content. Logic is also further included in the memory 204 to allow operations or job requests received by the coupling device 104 from computing devices to be converted to a format or protocol that can be executed by the printing device.

Software and firmware for the coupling device 104 can be automatically upgraded based upon access to various networks by the coupling device 104. Likewise, software for the coupling device 104 can be automatically installed on the coupling device 104 based upon access to various networks by the coupling device 104. Accordingly, software such as, for example, drivers related to the printing device for various computing devices, can be automatically installed onto the coupling device 104. Likewise, software for various other types of computing devices, such as, for example, PDAs and mobile phones, etc., can be auto-installed onto the coupling device 104. The software for the various computing devices installed on the coupling device 104 allows the coupling device 104 to receive a print job from a particular computing device, convert the print job to the appropriate format for the printing device and forward the print job to the printing device for printing. Thus, the coupling device acts as a pass-through device that allows for communication between the printing device and a variety of computing devices 102.

Power can be provided for the coupling device 104 via a USB connection with the printing device. Additionally, if the coupling device 104 is directly coupled, i.e., wired, to the printing device, then power can also be received from the printing device. Additionally, a separate power source connection can be provided for the coupling device 104. Batteries (not illustrated) may also be included with the coupling device 104 to provide power thereto. Large capacitors (not illustrated), often referred to as "super CAPs," can also be included within the coupling device 104 to store power received from the USB connection to be used in the future in place of or in conjunction with power received from the USB connection to help ensure that ample power is provided for the coupling device 104.

In an embodiment, in order to "enumerate," i.e., properly couple and configure the coupling device 104 to the host computing device 102, when the coupling device 104 is coupled to the printing device, the coupling device 104 reads the configuration information from the printing device and then reports itself to the host computing device 102 as the same printing device. Various interfaces, except the printer interface, are echoed from the host computing device 102 to the printing device and vice versa. This is the general pass-through function and the standard printer driver on the host computing device 102 for the printing device will work as if there was nothing, i.e., no coupling device 104, between the host computing device 102 and the printing device.

In another embodiment, the coupling device 104 may re-map all end points and interfaces, as well as the IEEE 1284 device identification (ID) string of the printing device. This allows the printing device to also support other protocols that the printing device may not currently support. This also allows the printing device to be mapped to a different model printer for support of full-featured print drivers. The coupling device 104 reads the IEEE 1284 device ID string from the printing device and uses the information to decide the languages that the printing device will support. Then, if the languages match the supported languages of the coupling device 104, the printing device can be supported by the coupling device 104.

Sometimes, the coupling device 104 is coupled to the printing device and the printing device is not fully or even partly recognized by the coupling device. For example, the coupling device 104 may not recognize how to obtain status information from the printing device. This can be due to the coupling device 104 not recognizing the manufacturer of the printing device or the coupling device 104 not recognizing the model of the printing device from a known manufacturer. Thus, the coupling device 104 may have limited or even no knowledge of the printing device. Generally, different printing devices may use different codes or commands to perform various operations. For example, different printing devices may use different codes to represent printing device status. For example, a paper out code can be 0x100001 from one printing device a particular manufacturer while 0x130001 may be the paper out code from another printing device from a different manufacturer, or even from different models or product lines from the particular manufacturer.

In accordance with various embodiments, the coupling device 104 can use user feedback to discover information about the printing device. For example, the user feedback can provide information to the coupling device 104 that allows the coupling device 104 to determine a status reporting mechanism of the printing device with which the coupling device 104 can communicate with the printing device. The user feedback can also provide one or more codes for various commands that can be used with the printing device such as, for example, a status reporting of the printing device. The user feedback may also provide information that may be used by the coupling device 104 to select a set of preexisting codes or commands for the printing device that the coupling device has stored in memory, either in the coupling device 104, the host device 102 or on network.

For example, there are many different status reporting mechanisms with which a printing device can report its status. Examples include, but are not limited to, specific USB endpoints, IEEE 1284.4 print channels using Print Job Language (PJL) device status, and IEEE 1284.4 Print Management Language (PML) message channel queries. As is known, a USB endpoint is similar to an electrical terminal or a wiring junction for USB data in a USB peripheral device. An Endpoint is a part of the hardware: usually a set of memory registers that can temporarily hold multiple bytes of data on their way in or out. A USB peripheral hardware device generally contains a limited number of endpoints. Endpoints generally come in pairs, e.g., endpoint 1 In and endpoint 1 Out. The USB hardware does not have to be programmed to use all of its endpoints. Also, as is known IEEE 1284.4 is a Transport Protocol standard that may be used across an IEEE Std. 1284-1994 parallel port interface, or any other suitable physical interface such as USB or IEEE 1394. This standard generally provides a protocol to create and maintain multiple conversations across a single parallel port link. With this protocol, multiple applications generally have access to the individual functions without the knowledge of the other applications.

However, in order for the coupling device 104 to report the status of the printing device to the host device 102, the coupling device 104 needs to know the correct way, i.e. status reporting mechanism, to collect the status from the printing device. In an embodiment, when the coupling device 104 is coupled to the printing device for the first time, the coupling device 104 may determine that the printing device is not in the list of known printing devices, i.e., the printing device is not listed among the known printing devices within the memory 204 of the coupling device 104. The coupling device 104 can instruct a user of the host device 102 to perform some type of predetermined or known task to create a situation at the printing device. For example, the coupling device 104 may instruct the user to perform a predetermined or known task such as, for example, remove all paper in input trays of the printing device, send a print job request that requires a particular paper size to the printing device, open a lid or door of the printing device, create a jam within the printing device, remove one or more toner cartridges, etc. This will create a status of the printing device that the printing device will attempt to report to the host device via the coupling device. The coupling device 104 sends a job request to the printing device and waits for a status message from the printing device. If the coupling device 104 receives the status message from the printing device, then the coupling device 104 has discovered a status reporting mechanism with which the printing device communicates status of the printing device. Furthermore, the coupling device 104 has discovered a code for the status of the printing device that corresponds to the situation of the printing device the user created. If no status message of the printing device is received by the coupling device 104, the process can be repeated by using one of other mechanisms known to the coupling device 104 until a status message is received by the coupling device 104 and an appropriate status reporting mechanism for communicating with the printing device is discovered by the coupling device 104. If no status reporting mechanism is ever discovered for the printing device, then status reporting for the printing device is disabled within the coupling device 104.

Once a code corresponding to status for the printing device based upon the predetermined or known situation created by the user is received by the coupling device 104, the coupling device 104 can store the status code in the memory 204. Additionally, the code can be used to search sets of status codes within the memory 204 of the coupling device 104. Such sets of status codes can be stored in the memory 204 in look-up tables. If the status code received by the coupling device 104 is found within a set of status codes in the memory 204, then the coupling device 104 may assume that all the status codes in the set correspond to the printing device to which the coupling device 104 is coupled. This is especially true if the printing device is from a known manufacturer but is an unknown model because manufacturers often use the same sets of status codes (as well as other codes) in all of their models to save on development costs for software and firmware. If a match with one or more status codes is found within multiple sets of status codes (for example, the reported status code is found to match the paper-out status code from the set of status codes from both known product model A and known product model B). In an embodiment, the coupling device can further generate or prompt the user to generate another status event based upon another predetermined or known task such as, for example, prompting the user to open a door (or panel) of the printing device or prompting the user to create a paper feed jam, to further identify the status code set to use for the unknown printing device. Identifying a matching set of status codes can also help the coupling device 104 to identify the printing device to some extent that may be useful for other purposes, such as, for example, identifying the supported print formats of the printing device, identifying other needed codes for the printing device, etc. If no match for the status code is found in a known set of status codes, then the coupling device 104 may create a set of status codes for the printing device. The coupling device 104 may instruct the user to create more situations based upon predetermined or known tasks for various types of status for the printing device and send more job requests to the printing device in order to receive more status codes to add to the set of status codes for the printing device to which the coupling device 104 is coupled. By doing this, most of the statuses that are critical for daily print jobs can be discovered, such as paper out, paper jam, etc.

Additionally, if in response to a job request from the coupling device a new unknown status code is detected from the printing device, the user can be asked to identify a status of the printing device to match the new unknown status code to an application status. For example, if the coupling device is reporting an unknown status of the printing device, the user can provide feedback to the coupling device 104 by identifying the status of the printing device as "out of paper" so that the coupling device 104 can update the set of status codes for the printing device to use printing device status reporting.

Figure 3:
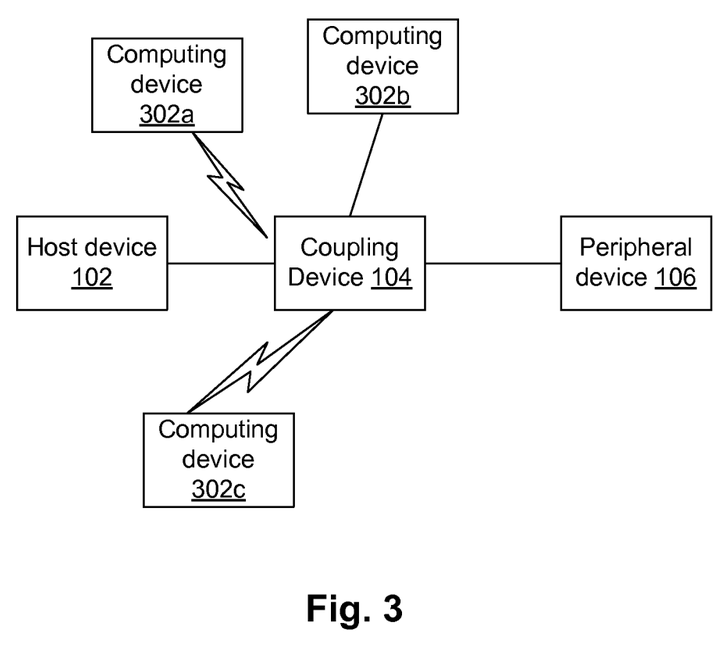
FIG. 3 schematically illustrates a plurality of host devices coupled to the printing device via the coupling device.

As can be seen in FIG. 3, multiple computing devices 302*a*, 302*b*, 302*c*, can also interact with the printing device via wireless connection (computing devices 302*a*, 302*c*) and wired or physical connections (computing device 302*b*) with the coupling device 104 due to the presence of wireless access interfaces and other types of interfaces. Thus, other computing devices of a user, such as, for example, a laptop computer, a notebook computer, a tablet computer, a personal digital assistant (PDA), a smart phone, and another type of mobile phone, etc. could be used to interact with the printing device via the coupling device 104 via a wireless connection. Thus, the coupling device 104 adds wireless capabilities to the printing device that allow for a variety of other computing devices to interact with the printing device. Likewise, multiple computing devices can also couple to and interact with the coupling device 104 via wired connections and/or networks. The various connections can be different among the computing devices and the coupling device 104 depending upon the types of the computing devices and their capabilities. Furthermore, no host computing device 102 needs to be used with the coupling device 104 if desired. The coupling device 104 can be used without a host computing device 102, for example, with one or more wireless devices in order to provide wireless capabilities to the printing device if desired. In general, the printing device will still be connected to the coupling device 104 via a wired or physical connection due to the fact that in some embodiments, the printing device is an older model printing device, such as a legacy printer, that has fewer connection capabilities than newer model printing devices.

If the coupling device 104 includes a LAN interface and corresponding logic included within memory 204, the host computing device 102 and the printing device 104 can communicate with other devices included within the LAN via the coupling device 104. Likewise, the other devices included within the LAN can communicate with the host computing device 102 and the printing device 104 via the coupling device 104. Thus, the coupling device 104 can add LAN connectivity to the printing device for local access networks for multiple computing devices if desired.

Additionally, a wireless LAN (Wi-Fi) type arrangement can also be utilized for connecting multiple computing devices to the coupling device 104. Thus, an access point or a micro-access point (not illustrated) may be utilized to couple various computing devices to the coupling device 104. In general, the printing device will still be connected to the coupling device 104 via a wired connection due to the fact that in many embodiments, the printing device is an older model printing device, such as a legacy printer, that has fewer connection capabilities than newer model printing devices.

In accordance with various embodiments, the coupling device 104 is configured to allow for various types of print jobs and print applications from various services such as, for example, AirPrint, Cloud Print and e-Print. AirPrint is a feature in Apple® operating systems starting with OS X Lion and iOS 4.2, for printing via a wireless LAN (Wi-Fi), either directly to AirPrint-compatible printers, or to non-compatible printers by way of, for example, a Microsoft® Windows®, Apple® OS X or GNU/Linux PC. Cloud Print is a Google® service that was created to allow any Cloud Print-aware application (web, desktop, mobile) on any device in the "network cloud" (a network-accessible computing platform) to print to any printer without Google® having to create and maintain printing subsystems for all the hardware combinations of client devices and printers, and without the users having to install device drivers to the client, but with documents being fully transmitted to Google®. e-Print is a print application developed by Hewlett-Packard®. Other types of print jobs and print applications from other services may also be supported.

In accordance with various embodiments, the coupling device 104 can also allow the printing device to perform other functions such as scanning and/or faxing from a wireless device. For example, a wireless device can access a network site located on, for example, the Internet, and a page from the network site can be provided to the coupling device 104 and then to the printing device. The printing device can then place the page in the proper format for a scanned document or a faxed document that can be provided back to the coupling device 104 and on to the original wireless device that provided the page, or to another wireless device.

Thus, the coupling device 104 can allow for a USB device, such as the printing device, to be plugged into the coupling device 104. The USB device can then be echoed or modified back to the host computing device 102. Any USB interface on the USB device that is detected will be scanned to determine if it can be supported by the coupling device 104. If any protocols are found that can be supported, then the coupling device 104 will be able to add wireless printing support to the printing device 104. The coupling device 104 can also provide conversion from standard wireless protocols or standard USB protocols to the protocols that are supported by the printing device. In general, the configuration is simple for the wireless interfaces. Furthermore, the coupling device 104 can provide support for a large number of printers irrespective of the manufacturers. The coupling device 104 thus generally serves a print controller or a print server.

Figure 4:
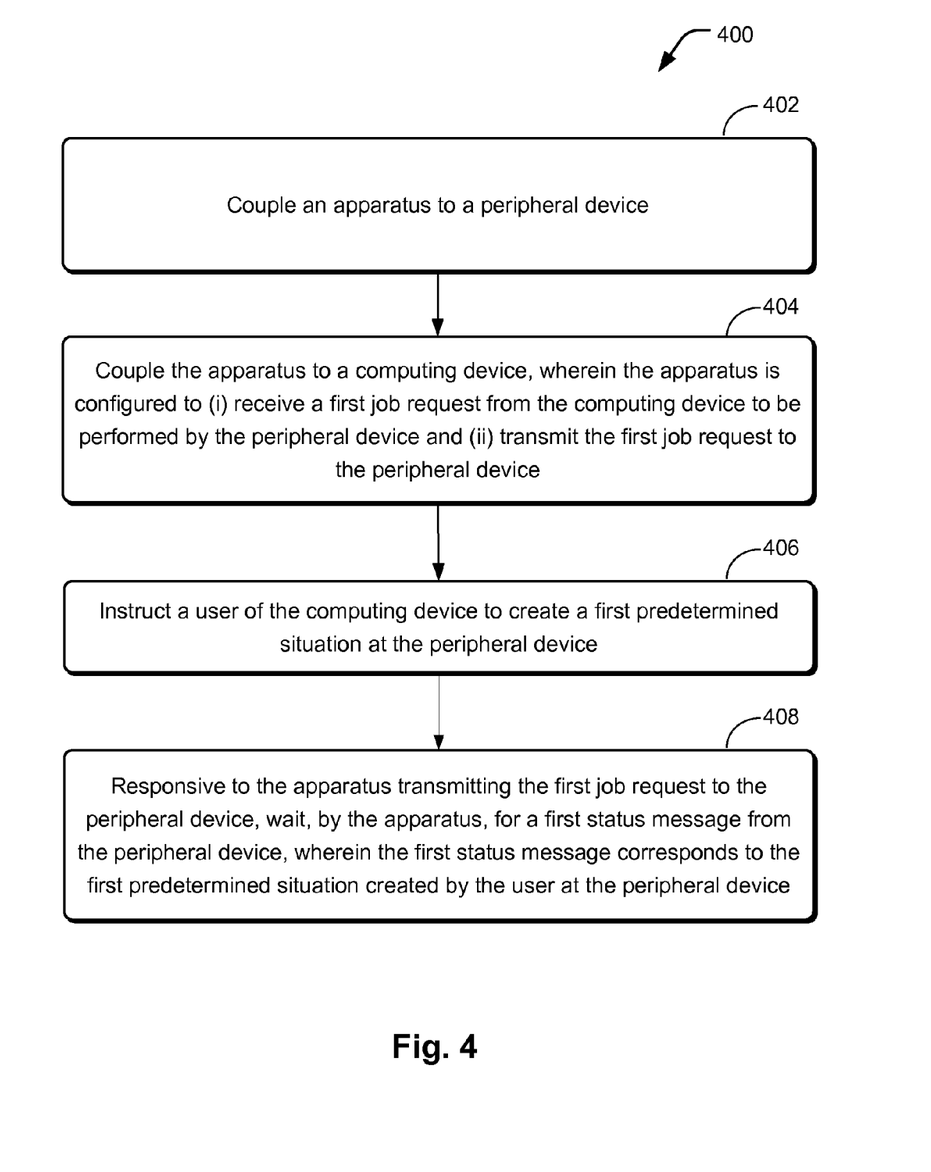
FIG. 4 is a flow diagram illustrating an example method of receiving status messages at a coupling device, where the status messages correspond to situations created by a user at a peripheral device coupled to the coupling device.

FIG. 4 is a flow diagram illustrating an example method 400 of receiving status messages at an apparatus (e.g., coupling device 104), where the status messages correspond to situations created by a user at a peripheral device coupled to the apparatus. At 402, an apparatus is coupled to a peripheral device. At 404, a computing device is coupled to the apparatus, wherein the apparatus is configured to (i) receive a first job request from the computing device to be performed by the peripheral device and (ii) transmit the first job request to the peripheral device. At 406, a user of the computing device is instructed to create a first predetermined situation at the peripheral device. At 408, responsive to the apparatus transmitting the first job request to the peripheral device, the apparatus waits for a first status message from the peripheral device, wherein the first status message corresponds to the first predetermined situation created by the user at the peripheral device.

In accordance with various embodiments, an article of manufacture may be provided that includes a storage medium having instructions stored thereon that, if executed, result in the operations described herein with respect to certain aspects of the method 400 (and/or various other operations discussed herein). In an embodiment, the storage medium comprises some type of non-transitory memory, such as memory 204. In accordance with various embodiments, the article of manufacture may be a computer-readable medium such as, for example, software or firmware.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method comprising:
   communicating, by an apparatus, with a peripheral device;
   communicating, by the apparatus, with a computing device, wherein the apparatus is configured to (i) receive a first job request from the computing device to be performed by the peripheral device and (ii) transmit the first job request to the peripheral device;
   instructing, by logic included in the apparatus, a user of the computing device to create a first predetermined situation at the peripheral device; and
   responsive to the apparatus transmitting the first job request to the peripheral device,
      receiving, by the apparatus, a first status message from the peripheral device, wherein the first status message corresponds to the first predetermined situation created by the user at the peripheral device.

2. The method of claim 1, further comprising:
   comparing, by the logic included in the apparatus, the first status message with sets of status messages; and
   based upon comparing the first status message with sets of status messages, selecting a set of status messages to associate with the peripheral device.

3. The method of claim 2, wherein the peripheral device comprises a printing device and the set of status messages relates to various statuses of the printing device.

4. The method of claim 2, further comprising based upon the set of status messages, identifying the peripheral device.

5. The method of claim 1, wherein the peripheral device comprises a printing device and the status reporting mechanism is one of a Universal Serial Bus (USB) endpoint, an Institute of Electrical and Electronics Engineers (IEEE) 1284.4 print channel using print job language (PJL) or IEEE 1284.4 print management language (PML) message channel query.

6. The method of claim 1, further comprising:
   based upon the first status message, creating a set of status messages for the peripheral device; and
   storing the set of status messages in a memory of the apparatus.

7. The method of claim 6, further comprising:
   receiving an unknown status message;
   instructing, by the apparatus, the user to identify a status of the peripheral device;

based upon the status of the peripheral device, creating a new status message for the peripheral device; and adding the new status message to the set of status messages in the memory of the apparatus.

8. The method of claim 1, wherein the peripheral device comprises a printing device and the set of status messages relates to various statuses of the printing device, and wherein instructing a user of the computing device to create a situation at the peripheral device comprises instructing the user to one of (i) remove all paper in input trays of the printing device, (ii) send a job with a particular paper size to the printing device, (iii) open a lid of the printing device, (iv) open a door of the printing device, (v) create a jam within the printing device, or (vi) remove toner cartridge(s).

9. The method of claim 1, wherein the first predetermined situation at the peripheral device comprises a first fault condition in the peripheral device, wherein the first fault condition in the peripheral device prohibits the peripheral device from executing the first job request received from the apparatus.

10. An apparatus comprising:
a plurality of interfaces, wherein a first interface of the plurality of interfaces is configured to couple the apparatus to a computing device, wherein a second interface of the plurality of interfaces is configured to couple the apparatus to a peripheral device, wherein the first interface is separate from the second interface, and wherein the apparatus is separate from each of (i) the computing device and (ii) the peripheral device;
memory configured to store logic, wherein the logic is configured to
instruct a user of the computing device to create a first predetermined situation at the peripheral device, and
responsive to the apparatus transmitting a first job request to the peripheral device,
wait for a first status message from the peripheral device, wherein the first status message corresponds to the first predetermined situation created by the user at the peripheral device; and
a processor configured to execute the logic.

11. The apparatus of claim 10, wherein the logic is further configured to:
compare the first status message with sets of status messages; and
based upon comparing the first status message with sets of status messages, select a set of status messages to associate with the peripheral device.

12. The apparatus of claim 11, wherein the logic is further configured to, based upon the set of status messages, identify the peripheral device.

13. The apparatus of claim 11, wherein the logic is further configured to:
receive an unknown status message;
instruct the user to identify a status of the peripheral device;
based upon the status of the peripheral device, create a new status message for the peripheral device; and
add the new status message to the set of status messages in the memory.

14. The apparatus of claim 10, wherein the peripheral device comprises a printing device, and wherein the logic is further configured to, if no status message is received by the apparatus, disable status reporting of the apparatus for the printing device.

15. The apparatus of claim 10, wherein the peripheral device comprises a printing device and the set of status messages relates to various statuses of the printing device, and wherein instruct a user of the computing device to create a situation at the peripheral device comprises instructing the user to one of (i) remove all paper in input trays of the printing device, (ii) send a job with a particular paper size to the printing device, (iii) open a lid of the printing device, (iv) open a door of the printing device, (v) create a jam within the printing device, or (vi) remove toner cartridge(s).

16. The apparatus of claim 10, wherein the first predetermined situation at the peripheral device comprises a first fault condition in the peripheral device, wherein the first fault condition in the peripheral device prohibits the peripheral device from executing the first job request received from the apparatus.

17. A non-transitory computer-readable storage medium having computer-executable instructions stored thereupon which, when executed by a computer, cause the computer to:
communicate with a peripheral device;
communicate with a computing device;
receive a first job request from the computing device to be performed by the peripheral device;
request a user of the computing device to create a first predetermined situation at the peripheral device, wherein the first predetermined situation comprises one of (i) removing all paper in an input tray of the peripheral device, (ii) opening a lid of the peripheral device, (iii) opening a door of the peripheral device, (iv) creating a jam within the peripheral device, or (vi) removing a toner cartridge from the peripheral device;
transmit the first job request to the peripheral device; and
in response to (i) the user of the computing device creating the first predetermined situation at the peripheral device and (ii) transmitting the first job request to the peripheral device, receive a first status message from the peripheral device, wherein the first status message corresponds to the first predetermined situation created by the user at the peripheral device.

18. The non-transitory computer-readable storage medium of claim 17, having further computer-executable instructions stored thereupon which, when executed by the computer, cause the computer to:
compare the first status message with a plurality of sets of status messages; and
based upon comparing the first status message with the plurality of sets of status messages, select a first set of status messages from the plurality of sets of status messages to associate with the peripheral device.

19. A non-transitory computer-readable storage medium having computer-executable instructions stored thereupon which, when executed by a computer, cause the computer to:
communicate with a peripheral device;
communicate with a computing device;
receive a first job request from the computing device to be performed by the peripheral device;
request a user of the computing device to create a first fault condition at the peripheral device;
transmit the first job request to the peripheral device; and
in response to (i) the user of the computing device creating the first fault condition at the peripheral device and (ii) transmitting the first job request to the peripheral device, receive a first status message from the peripheral device, wherein the first status message corresponds to the first predetermined situation created by the user at the peripheral device.

20. The non-transitory computer-readable storage medium of claim 19, wherein the first fault condition in the peripheral device prohibits the peripheral device from executing the first job request received from the apparatus.

* * * * *